United States Patent [19]

Hishon et al.

[11] Patent Number: 5,601,251
[45] Date of Patent: Feb. 11, 1997

[54] ADJUSTABLE AUTOMATIC LOCKING RETRACTOR

[75] Inventors: Michael K. Hishon, New Baltimore; Harley L. Kapanka, Auburn Hills; Steven Stoll, Mt. Clemens, all of Mich.

[73] Assignee: TRW Vehicle Safety Systems Inc., Lyndhurst, Ohio

[21] Appl. No.: 414,505

[22] Filed: Mar. 31, 1995

[51] Int. Cl.$^6$ .................................................. B60R 22/415
[52] U.S. Cl. ............................................................ 242/382.2
[58] Field of Search ............................ 242/382.2, 382.1, 242/382.4; 280/806, 807, 808; 297/475, 476, 477

[56] References Cited

U.S. PATENT DOCUMENTS

| | | |
|---|---|---|
| 4,585,186 | 4/1986 | Izuchi et al. . |
| 4,597,546 | 7/1986 | Yamamoto et al. . |
| 4,726,539 | 2/1988 | Schmidt et al. . |
| 4,767,082 | 8/1988 | Schmidt et al. ............. 242/382.2 |
| 4,809,926 | 3/1989 | Koike .............................. 242/382.2 |
| 5,297,752 | 3/1994 | Brown et al. . |
| 5,328,120 | 7/1994 | Schmid ........................... 242/382.4 |
| 5,474,247 | 12/1995 | Bareiss ........................... 242/382.2 |
| 5,505,400 | 4/1996 | Boelstler et al. ............... 242/382.2 |

Primary Examiner—John M. Jillions
Attorney, Agent, or Firm—Tarolli, Sundheim, Covell, Tummino & Szabo

[57] ABSTRACT

A seat belt retractor spool (14) has a seat belt (16) wound on the spool. Ratchet wheels (22) are fixed for rotation with the spool (14). A pawl (30) is movable into a position for blocking rotation of the ratchet wheels (22) and the spool (14) in a belt withdrawal direction (A). A lever (50) is pivotable to move the pawl (30) to the blocking position. A control ring gear assembly (94) is driven upon rotation of the spool (14) to cause the lever (50) to pivot after a predetermined length of the seat belt (16) is withdrawn from the spool (14). The control ring gear assembly (94) includes two members (96 and 118) which are mounted together, and which have projections (114, 122L), respectively, for engaging and pivoting the lever (50). The members (96 and 118) have interlocking portions (104 and 122) which are locked during mounting of the members (96 and 118) for preventing relative movement between the members. The interlocking portions (104 and 122) are unlocked during dismounting of the members to permit repositioning of the members relative to each other, which repositions the projection (122L). Changing the position of the projection (122L) changes the amount of rotation of the ring gear assembly (94) required prior to the projection (122L) pivoting the lever (50) to cause a lock-up of the retractor. This changes the predetermined length of the seat belt (16) that can be withdrawn.

14 Claims, 6 Drawing Sheets

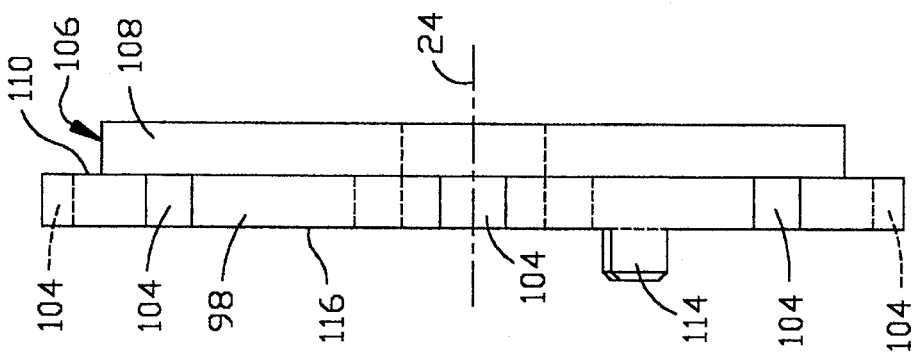
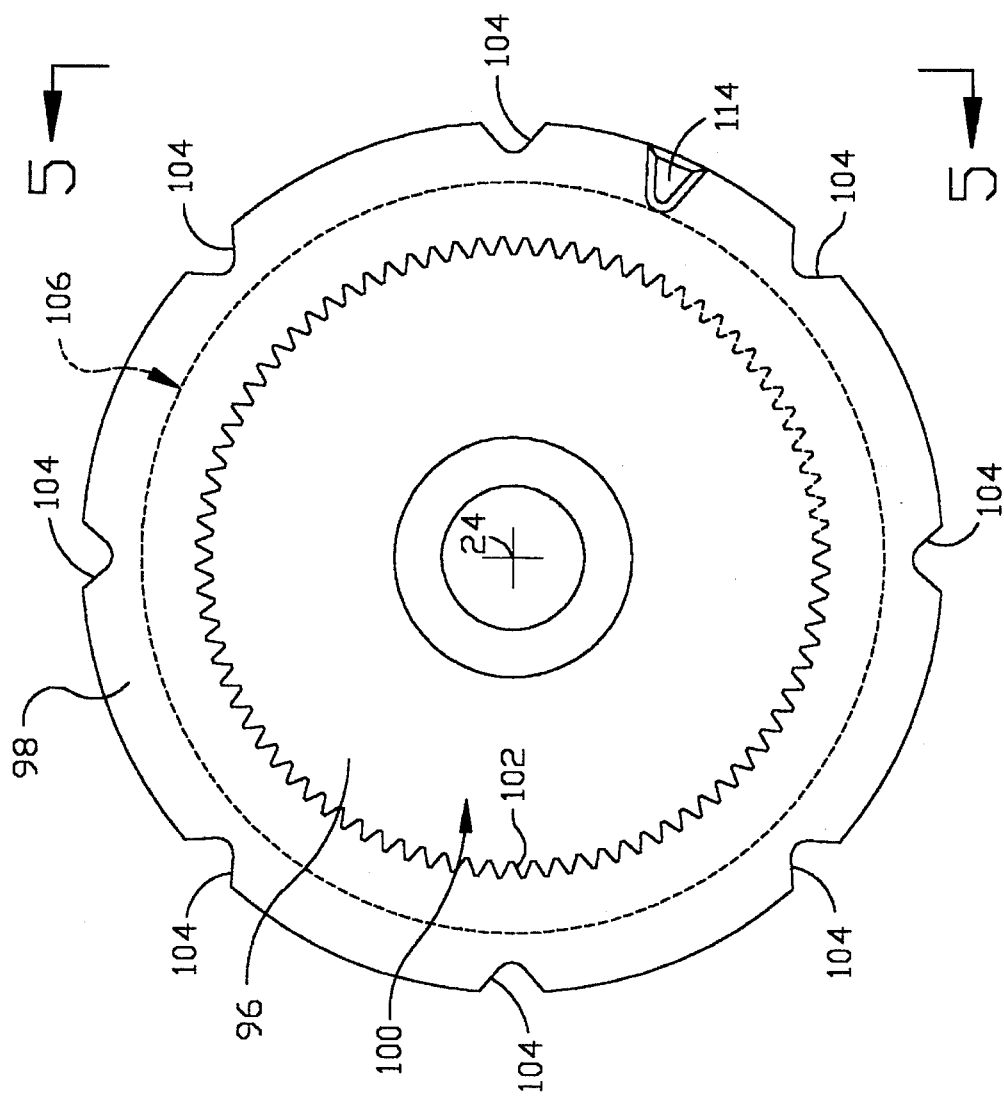

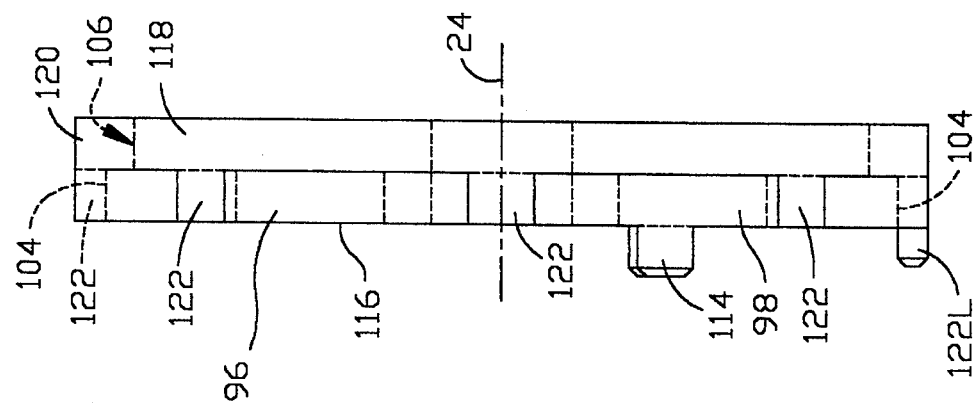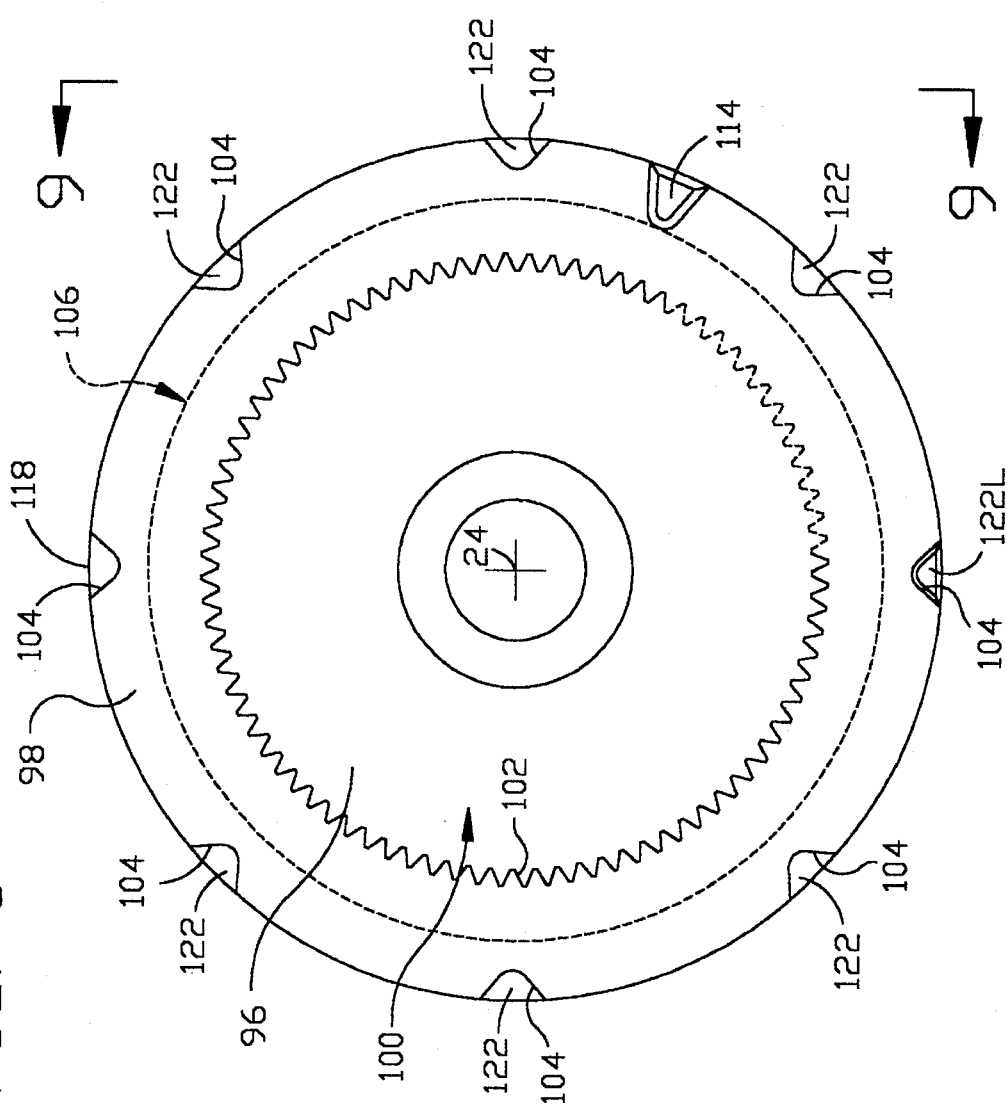

ADJUSTABLE AUTOMATIC LOCKING RETRACTOR

BACKGROUND OF THE INVENTION

The present invention relates to a vehicle seat belt retractor, and more specifically to a seat belt retractor having a pawl which is moved into engagement with a ratchet wheel to block rotation of a seat belt storage spool in a seat belt withdrawal direction in response to withdrawal of a predetermined amount of the seat belt from the spool.

A known retractor having a pawl which is moved into engagement with a ratchet wheel to block rotation of a seat belt storage spool in a seat belt withdrawal direction in response to withdrawal of a predetermined amount of a seat belt from the spool is disclosed in U.S. Pat. No. 4,726,539. The retractor disclosed in this patent has a ring gear which is rotated during withdrawal of the seat belt. A pair of tabs are formed on the outside of the ring gear. Upon extension of a predetermined amount of the seat belt, one of the tabs engages an arm on a mode switching lever to pivot the switching lever. Pivotal movement of the switching lever actuates an overcenter spring to move a pawl into engagement with a ratchet wheel to block rotation of the spool in a seat belt withdrawal direction. Upon retraction of almost the entire length of the seat belt back onto the spool, a second arm on the switching lever is engaged by the other tab to pivot the switching lever. The overcenter spring is then actuated by the switching lever to move the pawl out of engagement with the ratchet wheel.

SUMMARY OF THE INVENTION

The present invention relates to a seat belt retractor which has a pawl which is automatically engaged against a ratchet wheel to block seat belt withdrawal from a seat belt storage spool in response to withdrawal of a predetermined amount of seat belt from the spool. Specifically, the present invention is a seat belt retractor which is adjustable to change the amount of seat belt which can be withdrawn from the spool prior to automatic blocking of withdrawal of seat belt from the spool.

The spool is rotatable about an axis in belt withdrawal and belt retraction directions. The ratchet wheel is fixedly connected with the spool and is rotatable with the spool. The pawl has a blocking position for blocking the ratchet wheel and the spool against rotation in the belt withdrawal direction. Also, the pawl has a release position for permitting rotation of the ratchet wheel and the spool in the belt withdrawal direction.

A movable control means automatically causes movement of the pawl between the release position and the blocking position. The control means includes first and second members. The first member is mounted to the second member for conjoint movement with the second member. The first member has an actuator means which is positioned on the control means for causing movement of the pawl to the blocking position when the actuator means reaches an actuation position during movement of the control means.

A drive means moves the control means upon rotation of the spool. The drive means moves the control means and causes movement of the actuator means to the actuation position during withdrawal of a predetermined length of the seat belt. The control means includes adjustment means for permitting adjustment of the position of the actuator means on the control means, which results in a change in the predetermined length of the seat belt which is withdrawn prior to the actuator means reaching the actuation position. The adjustment means includes interlock means on the first and second members which is locked during mounting of the first member to the second member in one of several relative positions for preventing relative movement between the first and second members. The interlock means is unlocked during dismounting of the first member from the second member for permitting repositioning of the first member relative to the second member to another of the several relative positions.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein:

FIG. 4 is an illustration of a part of the retractor of FIG. 1;

FIG. 5 is a view taken along line 5—5 in FIG. 4;

FIG. 8 is an illustration of the parts shown in FIGS. 4 and 6 mounted together; and FIG. 9 is a view taken along line 9—9 of FIG. 8.

DESCRIPTION OF PREFERRED EMBODIMENT

Figure 1:
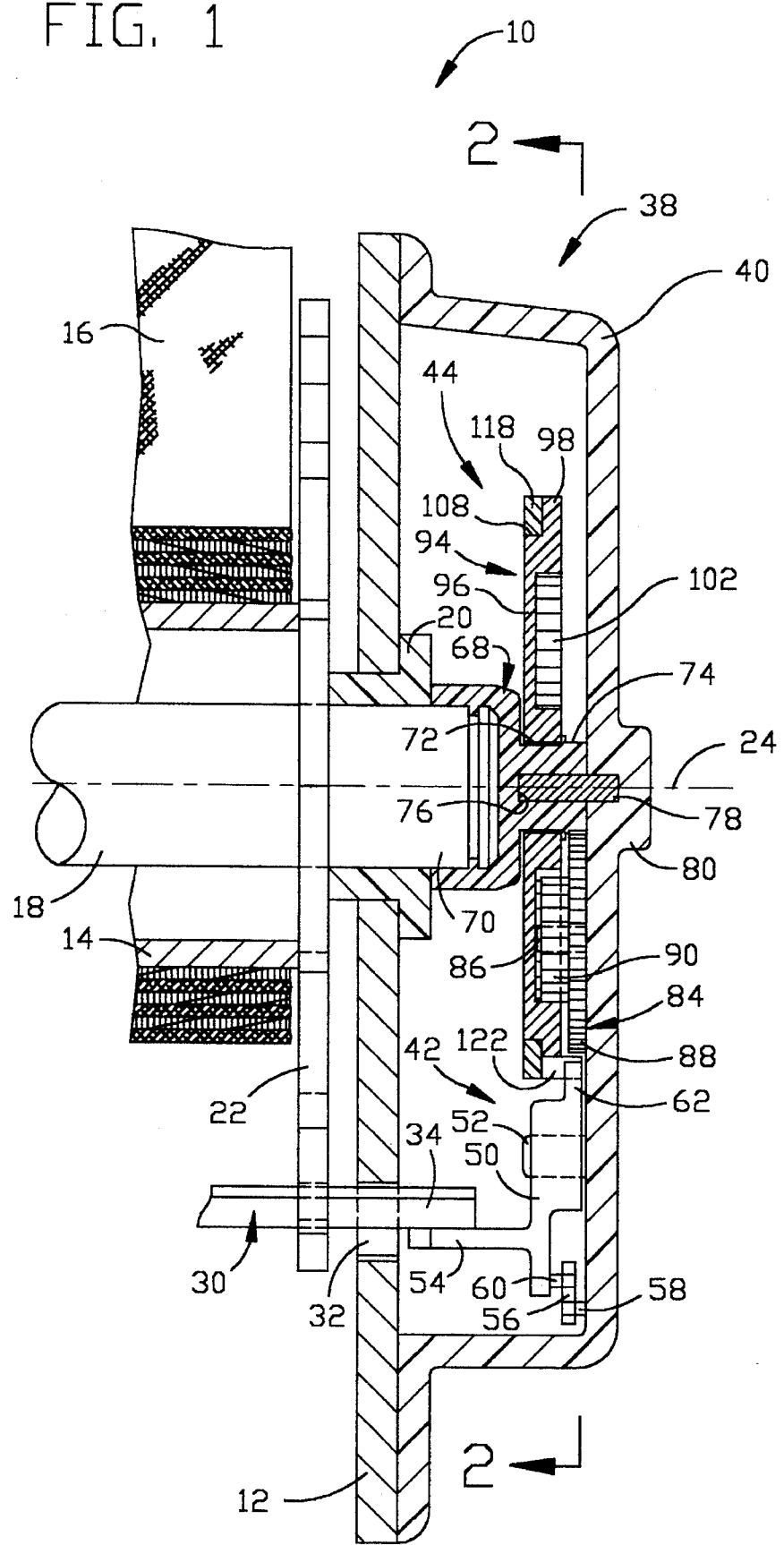
FIG. 1 is a partially broken away, longitudinal sectional view of a seat belt retractor embodying the present invention.

The present invention relates to a vehicle seat belt retractor. The seat belt retractor may be of many different constructions. As representative of the present invention, a vehicle seat belt retractor 10 is illustrated in FIG. 1.

The seat belt retractor 10 includes a metal frame 12, which is adapted to be fixed to a vehicle, and a seat belt storage spool 14, which is rotatable about an axis 24 relative to the frame 12. The spool 14 is fixed to and supported for rotation by a cylindrical shaft 18. The shaft is rotatably supported at its ends by bearings 20 (only one shown in FIG. 1) mounted in the frame 12. Two metal toothed locking ratchet wheels 22 (only one shown) are also fixed to the spool 14 at its opposite ends. Thus, the spool 14, the shaft 18, and the ratchet wheels 22 rotate as a unit relative to the frame 12 about the axis 24.

A length of seat belt 16 is wound on the spool 14. An end of the seat belt 16 is attached to the spool 14, in a known manner. The spool 14 is rotatable in a seat belt withdrawal (unwinding) direction A (FIG. 2) and a seat belt retraction (winding) direction B. A rewind spring (not shown) acts between the frame 12 and an end of the shaft 18 to bias the shaft 18 to rotate in the seat belt retraction direction B, as is known.

A metal pawl or bar 30 (FIG. 1) is pivotably supported in openings 32 (only one shown) formed in the frame 12. The pawl 30 has portions which are adjacent to the ratchet wheels 22 and which are movable into engagement with the ratchet wheels 22 upon pivoting of the pawl 30 to a blocking position (shown in FIG. 2) from a release position (shown in FIG. 3). In the blocking position (FIG. 2), the pawl 30 blocks rotation of the ratchet wheels 22 and the spool 14 in the seat belt withdrawal direction A. An emergency lock-up mechanism (not shown), such as an inertia mass sensor assembly, causes the pawl 30 to pivot to the blocking position upon the occurrence of vehicle deceleration above a predetermined deceleration, as is known.

Figure 2:
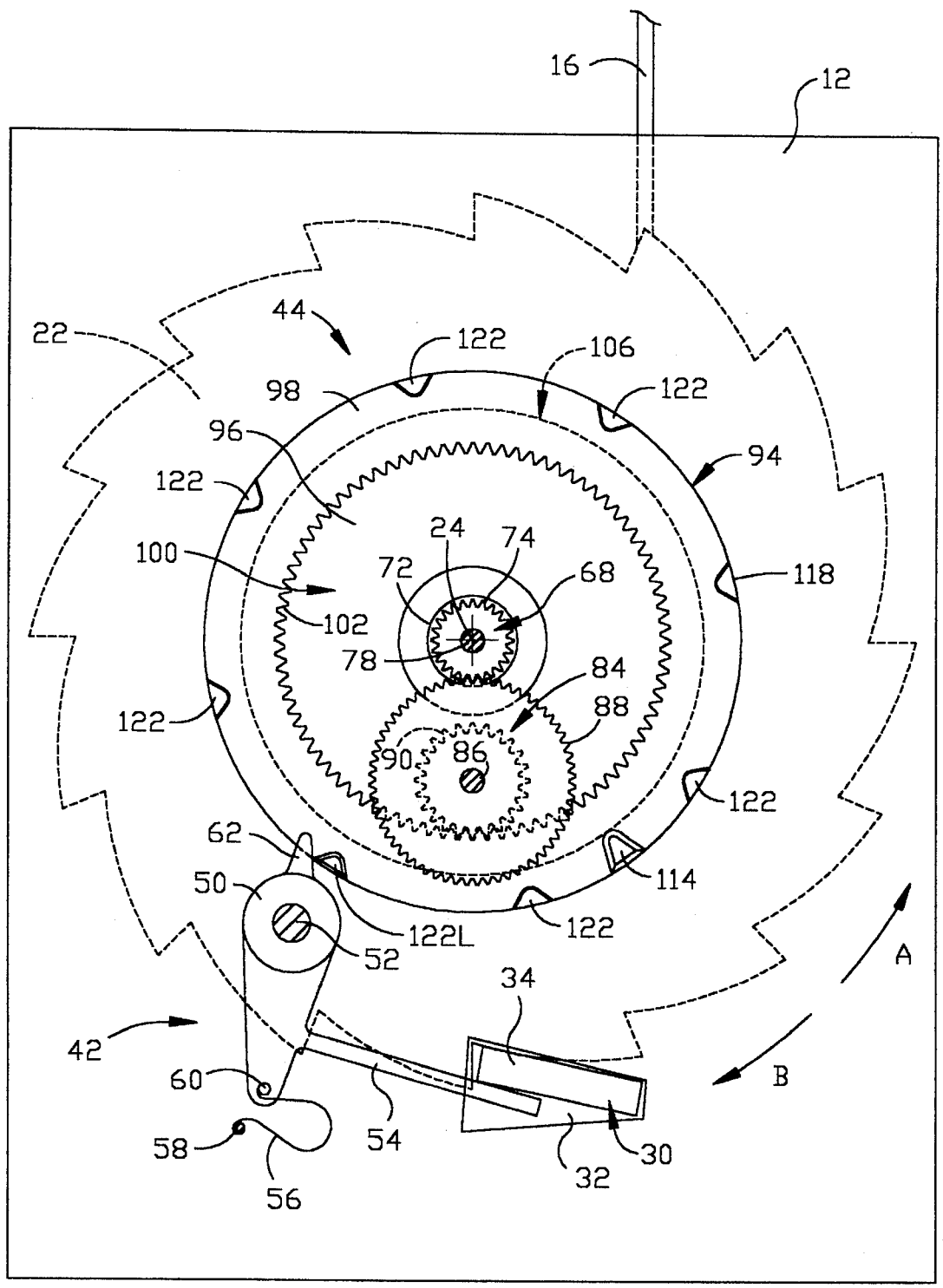
FIG. 2 is a view taken along line 2—2 of FIG. 1 with certain parts removed for clarity and showing certain parts in a first operational position.

A lock-up actuator assembly 38 (FIG. 1) also causes the pawl 30 to pivot to its blocking position shown in FIG. 2. However, this pivoting is automatic upon withdrawal of a predetermined amount of the seat belt 16 sufficient to extend across a vehicle occupant or article in order to provide for a positive securing of the seat belt 16.

The actuator assembly 38 (FIG. 1) includes a protective plastic support housing 40 fixed to one side of the frame 12. The housing 40 encloses a lever system 42 and a gear system 44, both of which comprise parts of the actuator assembly 38. The lever system 42 interacts with an extension portion 34 of the pawl 30 to pivot the pawl 30. The gear system 44 controls the lever system 42 upon rotation of the spool 14.

The lever system 42 includes a plastic lever 50 which is pivotably supported on a projection 52 on the cover 40. The lever 50 has a nose 62 which extends adjacent to the gear system 44. An arm 54 of the lever 50 extends below the extension portion 34 of the pawl 30. Upon pivoting of the lever 50 from a first position (shown in FIG. 3) to a second position (shown in FIG. 2), the arm 54 pivots and lifts the pawl 30 to its blocking position (FIG. 2) to engage and block rotation of the ratchet wheels 22 and the spool 14 in the belt withdrawal direction A. Thus, the lever 50 is a part for moving the pawl 30 to its blocking position.

A metal overcenter spring 56 of the lever system 42 extends between a projection 58 on the cover 40 and a projection 60 on the lever 50. The projection 60 is located on a portion of the lever 50 which extends away from the projection 52 in a direction opposite the nose 62. The overcenter spring 56 is stressed to provide a force which biases the projections 58 and 60 relatively away from each other. When the lever 50 is moved between its first and second positions, the projection 60 is moved through a short arc which varies the distance between the projection 58 and the projection 60. The smallest distance between the projections 58 and 60 along this arc is at a transition position (not shown) of the lever 50. The stress in the overcenter spring 56 increases during the movement from the first position to the transition position and the stress decreases during the movement from the transition position to the second position.

Thus, during pivoting of the lever 50 from its first position to its second position, the overcenter spring 56 biases the lever 50 toward its first position until the transition position is reached. Once the transition position is reached, the overcenter spring 56 biases the lever 50 toward its second position. Further, the stress in the overcenter spring 56 causes the lever 50 to snap to its second position. Upon pivoting of the lever 50 from its second position to its first position, the overcenter spring 56 provides a similar change of bias at the transition position. Thus, the overcenter spring 56 provides a force which holds the lever 50 in either its first or second position until the lever 50 is moved against the bias of the overcenter spring 56.

The gear system 44 includes a plastic central gear member 68 which is interlocked onto an extension end 70 (FIG. 1) of the shaft 18, such that the central gear member 68 is rotated with the spool 14. The central gear member 68 has a smooth external bearing hub surface 72 located adjacent to the shaft 18, an external array of gear teeth 74 located axially further from the shaft 18 than the bearing hub surface 72, and a smooth axial recess 76 formed in the distal end of the central gear member. A smooth support pin 78 fits in and extends from the recess 76 to a boss 80 on the cover 40 to support and align the central gear member 68 for rotation about the axis 24. The pin 78 may be fixed to either the central gear member 68 or the cover 40, or the pin 78 may be free floating.

A plastic intermediate gear member 84 (FIG. 2) is rotatably mounted on a projection 86 on the cover 40. The intermediate gear member 84 has a large diameter array of external gear teeth 88 and a small diameter array of external gear teeth 90 which are coaxial on an axis offset from the axis 24. The large and small diameter arrays of gear teeth 88 and 90 are fixed relative to each other, and in the preferred embodiment are integrally molded together as one piece. The large diameter array of gear teeth 88 intermeshes with the array of gear teeth 74 on the central gear member 68. Thus, as the spool 14 is rotated, the intermediate gear member 84 is rotated, but in the opposite direction.

A control ring gear assembly 94 includes a plastic ring gear 96 which is rotatably supported on the hub surface 72 (FIG. 1) of the control gear member 68 such that the control ring gear assembly 94 can rotate about the axis 24 relative to the central gear member 68. At its radially outer periphery, the ring gear 96 has an axially projecting, annular rim 98. The rim 98 is axially adjacent to the nose 62 of the lever 50 and moves past the nose 62 during rotation of the control ring assembly 94.

Formed on the radially inner circumference of the rim 98 is a circular array of internal teeth 102 (FIG. 4). The rim 98 also defines an annular space 100 into which the small diameter array of gear teeth 90 (FIG. 1) of the intermediate gear member 84 extends. The gear teeth 90 intermesh with the internal gear teeth 102 of the ring gear 96 such that the control ring gear assembly 94 is rotated upon rotation of the intermediate gear member 84. The central gear member 68 and the intermediate gear member 84 provide a drive connection between the rotational unit of the spool 14, the shaft 18 and the ratchet wheels 22, and the control ring gear assembly 94.

A plurality of notches 104 (FIG. 4) are formed in a radially outer periphery of the rim 98. Each notch 104 extends radially inward and across the axial width of the outer periphery. The notches 104 are equally spaced from one another about the outer periphery. In a preferred embodiment, there are eight notches 104, and each notch 104 has a general "V" shape and thus tapers as the notch extends radially. However, it is to be understood that variations in the shape of the notches 104 are possible.

An annular step 106 (FIG. 5) is formed on one axial side of the rim 98. The annular step 106 is defined by a cylindrical surface 108, which extends along the axis 24, and an annular planar surface 110, which extends radially. The cylindrical surface 108 is located at a radius which is less than the outermost radial extent of the rim 98. In the preferred embodiment, the cylindrical surface 108 is also located at a radius which is inward relative to the notches 104.

A projection 114 (FIGS. 4 and 5) extends in a direction parallel to the axis 24 from a face surface 116 on a side of the rim 98 opposite the annular step 106. The projection 114 is located between two adjacent notches 104 at generally the same radial distance from axis 24 as the notches 104. The projection 114 is fixed to the rim 98 and, in the preferred embodiment, is formed in one piece with the ring gear 96. During rotation of the control ring gear assembly 94 (FIG. 2), the projection 114 is moved about the axis 24 toward or away from a position (shown in FIG. 3) of engagement with the nose 62 of the lever 50.

Figure 7:
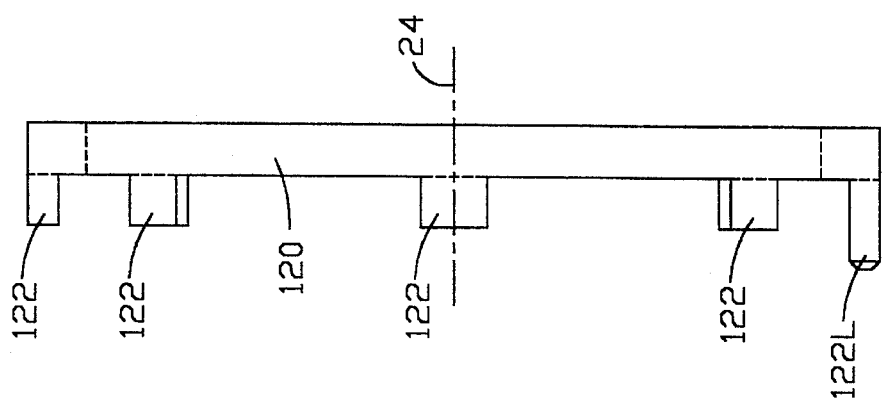
FIG. 7 is a view taken along line 7—7 in FIG. 6.
Figure 6:
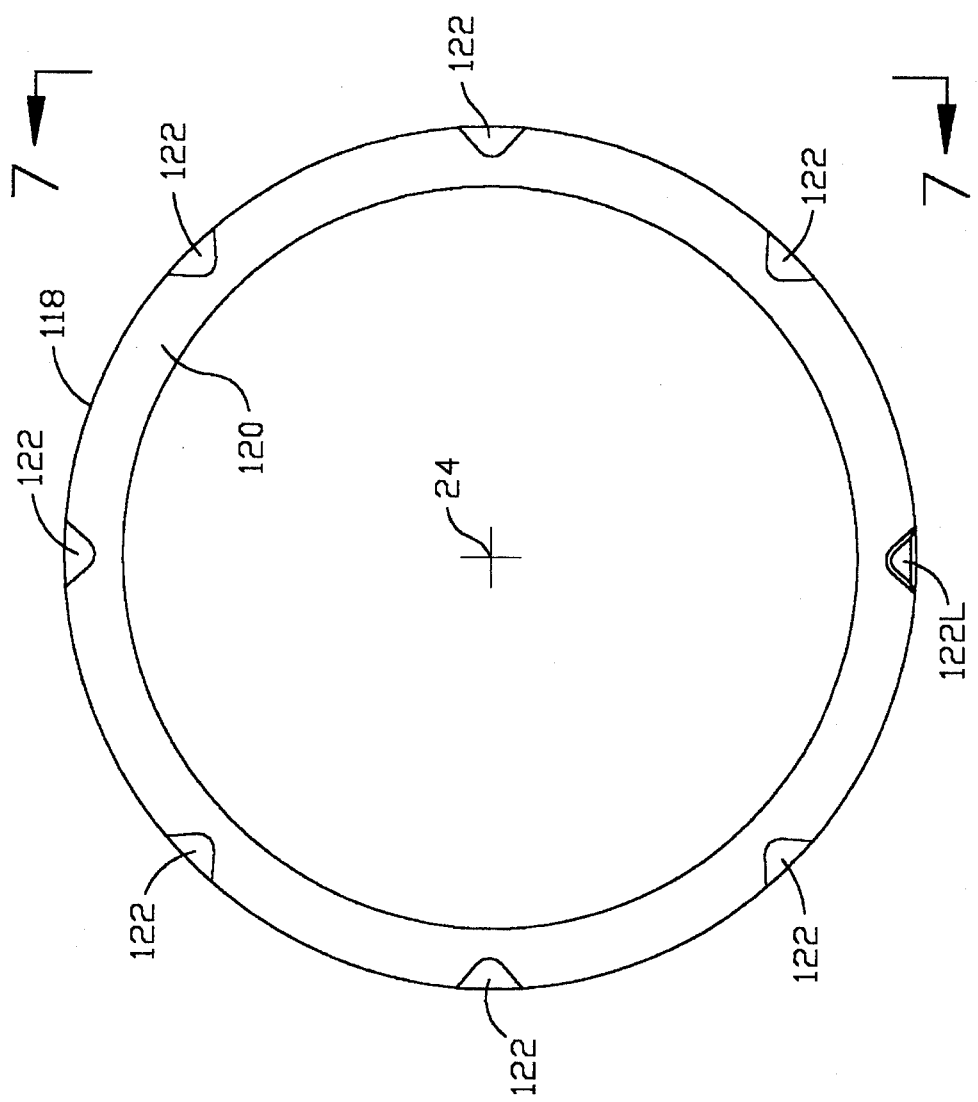
FIG. 6 is an illustration of another part of the retractor of FIG. 5.

The control ring gear assembly 94 also includes a circular ring 118 (FIG. 6) which has a body 120 and a plurality of projections 122 (FIG. 7). The body 120 is sized to just fit into the step 106 (FIG. 5) on the rim 98 of the ring gear 96. In the preferred embodiment, the radially inner side of the body 120 has a radius which is equal to or slightly smaller than the radius of the surface 108 of the step 106.

The projections 122 extend from the body 120 parallel to the axis 24 and are equally spaced from one another about the body 120. In the preferred embodiment, the projections 122 are formed in one piece with the body 120 and have generally "V" shaped radial cross-section tapers. All but one of the projections 122 have the same axial length. The one projection is longer than the rest, and is identified by an "L" suffix on reference numeral 122 and is hereinafter referred to as "the longer projection 122L" when specific details about it are discussed. The rest of the projections 122 have approximately the same axial length as the notches 104.

The number of projections 122 (FIG. 6) is equal to the number of notches 104 (FIG. 4) on the rim 98 of the ring gear 96, and the projections 122 are shaped and located to interfit into the notches 104. All of the projections 122 have the same radial cross-section and all of the notches 104 have the same radial cross-section. Thus, each projection 122 can be located into any notch 104. Also, in the preferred embodiment, the projections 122 have cross-sections which are equal to or slightly oversize relative to the size of the notches 104.

The ring 118 is mounted on the ring gear 96 (FIGS. 8 and 9) such that the ring 118 is located in the step 106 and the projections 122 are located in the notches 104. The interfitting of the projections 122 into the notches 104 rotationally locks the ring 118 relative to the ring gear 96 and prevents relative rotation between the ring 118 and the ring gear 96. Thus, the ring 118 is mounted for conjoint rotation with the ring gear 96 about the axis 24. The ring 118 and the ring gear 96 rotate together as a unit which comprises the control ring gear assembly 94.

The diameter of the radially inner side of the body 120 and/or the size of the cross-sections of the projections 122 results in a frictional interference fit such that a predetermined amount of force is required to push the ring 118 into the mounted position (FIG. 8) on the ring gear 96 during manufacture of the control ring gear assembly 94. Thus, the ring 118 is frictionally held onto the ring gear 96. This interference fit locks the ring 118 to the ring gear 96 and prevents axial removal or dismounting of the ring 118 from the ring gear 96 until a predetermined separating force is applied. The separating force is typically applied by inserting a flat blade tool along the surface 110, between the ring 118 and the ring gear 96.

The ends of the projections 122, except the longer projection 122L, are approximately flush with the face surface 116 of the ring gear 96. A portion of the longer projection 122L extends axially beyond the face surface 116 of the ring gear 96. The extending portion of the longer projection 122L is about the same length as the axial length of the projection 114 and is rotated along the same radius circle as the projection 114 during rotation of the control ring gear assembly 94. Thus, similar to the projection 114, the extending portion of the longer projection 122L is moved about the axis 24 toward and away from a position (shown in FIG. 2) of engagement with the nose 62 of the lever 50.

Figure 3:
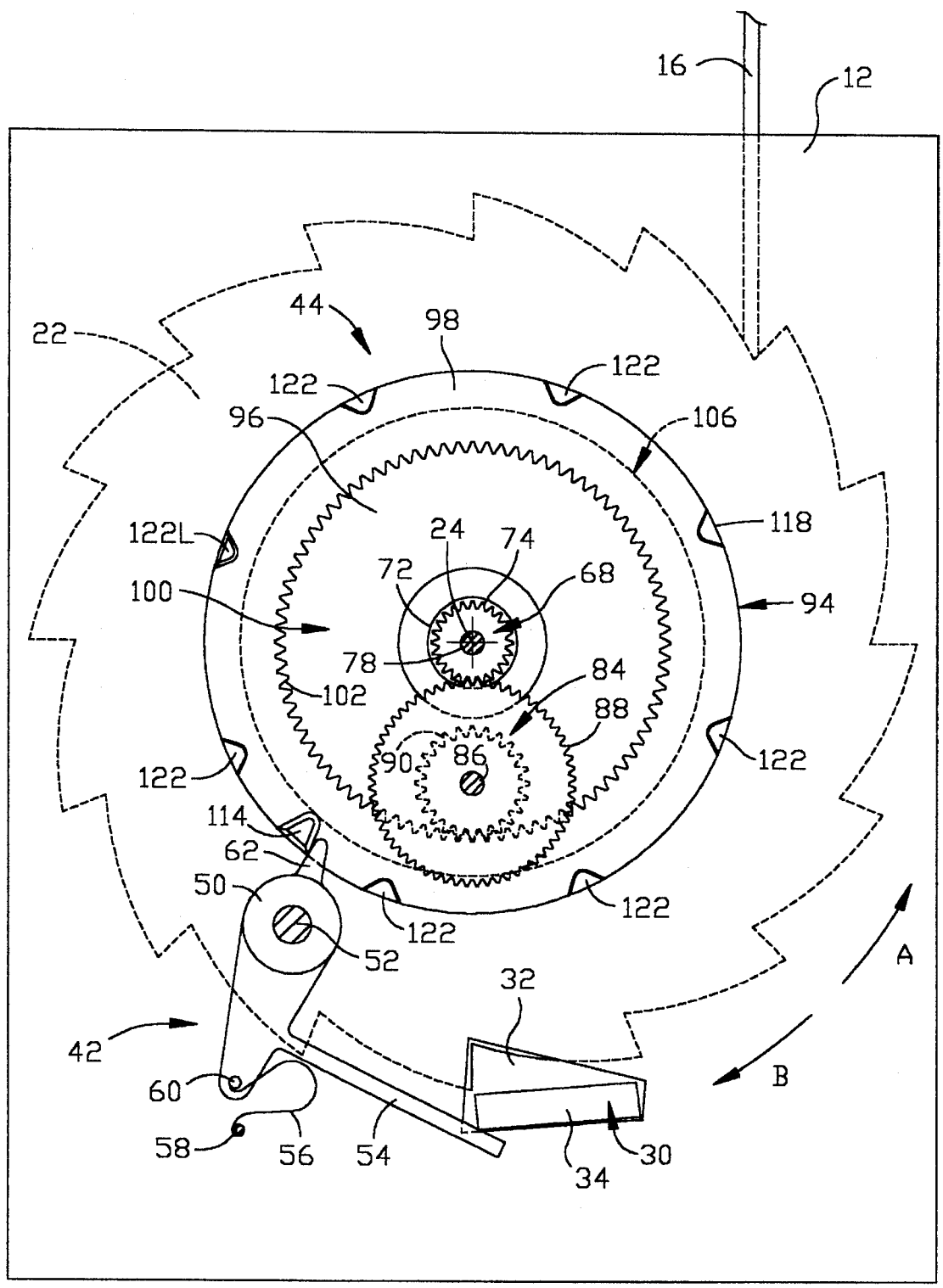
FIG. 3 is a view similar to FIG. 2 with certain parts shown in a second operational position.

When most of the seat belt 16 is retracted and wound onto the spool 14, the parts are in the position shown in FIG. 3, and the control ring gear assembly 94 is in a position near a starting rotational position. During withdrawal of the seat belt, the central gear member 68 rotates (counterclockwise, as viewed in FIGS. 2 and 3), the intermediate gear member 84 rotates in the opposite direction (clockwise), and the control ring gear assembly 94 also rotates in the direction (clockwise) opposite to that of the central gear member 68. The gearing ratios of the central gear member 68, the intermediate gear member 84 and the ring gear 96 are such that when a predetermined amount of the seat belt 16 is withdrawn to extend across an occupant or object located in an associated vehicle seat, the control ring gear assembly 94 is rotated, as a unit, from its starting rotational position to an ending rotational position (FIG. 2). The rotational range through which the control ring gear assembly 94 moves is less than one revolution. The ring gear 96 and the ring 118 rotate together as the unit which defines the control ring gear assembly 94 because of the interlocking of the projections 122 and the notches 104.

The longer projection 122L is positioned on the control ring gear assembly 94 such that the longer projection 122L is moved about the axis 24 to its position of engagement with the nose 62 during withdrawal of the predetermined amount of the seat belt 116. The longer projection 122L moves the lever 50 toward its second position (FIG. 2) against the bias of the overcenter spring 56. Once the transition position of the lever 50 is reached, the lever 50 snaps to its second position under the bias of the overcenter spring 56. Thus, the longer projection 122L is an actuator for causing the lever 50 to move. In the preferred embodiment, the predetermined amount of seat belt 16 which is withdrawn is predetermined to be most of the available length of the seat belt 16 and is associated with a rotational range of travel of the spool 14 of several revolutions.

With the lever 50 in its second position (FIG. 2), the pawl 30 is in its blocking position and blocks further withdrawal of the seat belt 16. The seat belt 16 may be wound back into the retractor 10 due to the sloped teeth on the ratchet wheels 22 which cam the pawl 30 radially outward as each tooth passes by the pawl 30 during rotation of the spool 14 and ratchet wheels 22 in the seat belt retraction direction B. This permits slack to be taken up from the fastened seat belt 16 and yet a new locking position can be established at each tooth. Also, this permits complete retraction of the seat belt 16 when unfastened.

During retraction of the seat belt 16, the central gear member 68 is rotated, as viewed in FIGS. 2 and 3, clockwise, the intermediate gear member 84 is rotated counterclockwise and the control ring gear assembly 94 is rotated counterclockwise. As the seat belt 16 approaches a completely retracted condition, the projection 114 engages the nose 62 and moves the lever 50 toward its first position (FIG. 3) against the bias of the overcenter spring 56. Once the transition point of the lever 50 is reached, the lever snaps to its first position (FIG. 3) under the bias of the overcenter spring 56. The pawl 30 can then drop away from the ratchet wheels 22 under the influence of gravity to its release position, and the retractor 10 is reset to permit a subsequent withdrawal of the seat belt 16.

The length of the seat belt 16 which is needed for proper extension across an occupant or article is different for different types and styles of vehicles. The length is dependent upon such factors as vehicle size and interior component placement. The present invention provides a retractor 10 which can be adjusted to enable several different lengths of the seat belt 16 to be withdrawn from the retractor prior to the occurrence of the automatic locking of the retractor (FIG. 1) by the actuator assembly 38.

Adjustment of the amount of the seat belt 16 that is withdrawn prior to automatic locking of the retractor 10 by the actuator assembly 38 is accomplished by adjusting the position of the longer projection 122L on the control ring gear assembly 96. This is done by removing or dismounting the ring 118 from the ring gear 96, which unlocks the ring 118 from the ring gear 96. The ring 118 is rotationally repositioned relative to the ring gear 96 to one of several positions such that each projections 122 is aligned with a new notch 104. This repositions the longer projection 122L relative to ring gear 96, and its array of gear teeth 102 and projection 114.

Repositioning the longer projection 122L relative to the ring gear 96 causes a change in the respective amounts of rotation of the control ring assembly 94 and the spool 14 which occur before the lever 50 is moved to its second position (FIG. 2). An increase in the amount of rotation of the control ring assembly 94 increases the amount of rotation of the spool 14 and increases the predetermined length of the seat belt 16 which is withdrawn prior to automatic lock-up. A decrease in the amount of rotation of the control ring assembly 94 results in an associated decrease in the amount of rotation of the spool 14 and a decrease in the predetermined length of the seat belt 16 which is withdrawn prior to automatic lock-up.

From the above description of the invention, those skilled in the art will perceive improvements, changes and modifications. Such improvements, changes and modifications within the skill of the art are intended to be covered by the appended claims.

Having described the invention, the following is claimed:

1. A seat belt retractor comprising:

spool means for storing a seat belt wound on said spool means, said spool means being rotatable about an axis in belt withdrawal and belt retraction directions;

a ratchet wheel fixed for rotation with said spool means;

movable pawl means having a blocking position for blocking said ratchet wheel and said spool means against rotation in the belt withdrawal direction and a release position for permitting rotation of said ratchet wheel and said spool means in the belt withdrawal direction;

movable control means for automatically causing movement of said pawl means between the release position and the blocking position, said control means including first and second members, said first member being mounted to said second member for conjoint movement with said second member, said first member including actuator means positioned on said control means for causing movement of said pawl means to the blocking position when said actuator means reaches an actuation position during movement of said control means; and drive means for moving said control means upon rotation of said spool means, said drive means moving said control means and causing movement of said actuator means to the actuation position during withdrawal of a predetermined length of the seat belt;

said control means including adjustment means for permitting adjustment of the position of said actuator means on said control means resulting in a change in the predetermined length of the seat belt which is withdrawn prior to said actuator means reaching the actuation position, said adjustment means including interlock means on said first and second members which is locked during mounting of said first member to said second member in one of several relative positions for preventing relative movement between said first and second members and unlocked during dismounting of said first member from said second member for permitting repositioning of said first member relative to said second member to another of the several relative positions.

2. A seat belt retractor as set forth in claim 1, wherein said interlock means includes a plurality of interfitting portions of said first and second members.

3. A seat belt retractor as set forth in claim 2, wherein said plurality of interfitting portions includes a plurality of notches on one of said first and second members and a plurality of projections on the other of said first and second members, said plurality of projections extending into said plurality of notches for fixing said first and second members in one of the plurality of relative positions.

4. A seat belt retractor as set forth in claim 3, wherein said plurality of projections are on said first member.

5. A seat belt retractor as set forth in claim 4, wherein said actuator means is on one of said plurality of projections.

6. A seat belt retractor as set forth in claim 3, wherein said control means is rotatable about an axis by said drive means, said plurality of projections extending from said other of said first and second members parallel to the axis.

7. A seat belt retractor as set forth in claim 3, wherein said control means is rotatable about an axis by said drive means, said plurality of notches being located at a radially outer periphery of said one of said first and second members.

8. A seat belt retractor as set forth in claim 3, wherein said control means is movable in a first direction by said drive means, said first member being moved in directions transverse to said first direction relative to said second member during mounting and dismounting.

9. A seat belt retractor as set forth in claim 2, wherein said second member has a gear tooth array for engagement with said drive means, said first member has an annular shape and is supported on said second member for movement with said second member as a unit.

10. A seat belt retractor as set forth in claim 9, wherein said drive means includes a gear means for engagement between said gear tooth array on said second member and said spool means.

11. A seat belt retractor as set forth in claim 10, wherein said gear means includes means for causing said control means to rotate less than one revolution during withdrawal of the seat belt webbing prior to prevention of rotation of said spool means.

12. A seat belt retractor as set forth in claim 1, including a mover means for moving said pawl means from the release position to the blocking position and for releasing said pawl means to permit said pawl means to move from the blocking position to the release position, said actuator means comprises a first projection for engaging said mover means, said second member having a second projection for engaging said mover means and causing movement of said pawl means to the release position.

13. A seat belt retractor as set forth in claim 12, wherein said control means has an outer periphery, and said first and second projections extend from said control means at said outer periphery.

14. A seat belt retractor as set forth in claim 13, wherein said control means is rotatable about an axis by said drive means, and said first and second projections extend axially.

* * * * *